United States Patent
Sica et al.

(10) Patent No.: US 10,037,147 B2
(45) Date of Patent: Jul. 31, 2018

(54) SHARING FILES IN A MULTISYSTEM ENVIRONMENT

(71) Applicant: International Business Machines Corporation, Armonk, NY (US)

(72) Inventors: Andrew M. Sica, Oxford, CT (US); Douglas M. Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 14/967,500

(22) Filed: Dec. 14, 2015

(65) Prior Publication Data

US 2017/0168712 A1    Jun. 15, 2017

(51) Int. Cl.
  *G06F 15/167* (2006.01)
  *G06F 3/06* (2006.01)
  *G06F 17/30* (2006.01)

(52) U.S. Cl.
  CPC .............. *G06F 3/061* (2013.01); *G06F 3/067* (2013.01); *G06F 3/0631* (2013.01); *G06F 3/0635* (2013.01); *G06F 17/30165* (2013.01)

(58) Field of Classification Search
  None
  See application file for complete search history.

(56) References Cited

U.S. PATENT DOCUMENTS

| | | | |
|---|---|---|---|
| 4,207,609 A | 6/1980 | Luiz et al. | |
| 5,202,887 A | 4/1993 | Ueno et al. | |
| 5,317,749 A | 5/1994 | Dahlen | |
| 5,537,574 A * | 7/1996 | Elko | G06F 9/52 700/5 |
| 5,860,132 A | 1/1999 | Carter et al. | |
| 5,960,446 A * | 9/1999 | Schmuck | G06F 17/30224 707/610 |
| 6,016,503 A | 1/2000 | Overby, Jr. et al. | |
| 6,389,482 B1 | 5/2002 | Bobak et al. | |
| 6,732,137 B1 | 5/2004 | Dearing et al. | |
| 6,823,337 B2 | 11/2004 | Armstrong et al. | |
| 7,073,178 B2 | 7/2006 | de Bonet et al. | |
| 7,191,465 B2 | 3/2007 | Benhase et al. | |
| 7,233,946 B1 * | 6/2007 | McPolin | G06F 9/52 |
| 7,461,152 B2 | 12/2008 | Bird et al. | |
| 7,711,830 B2 | 5/2010 | Bird et al. | |
| 7,716,305 B2 * | 5/2010 | Dearing | G06F 17/30067 707/687 |
| 7,792,916 B2 | 9/2010 | Dowedeit | |
| 7,818,758 B2 | 10/2010 | de Bonet et al. | |
| 7,849,197 B2 | 12/2010 | Bird et al. | |
| 8,185,907 B2 | 5/2012 | Gusler et al. | |
| 8,313,230 B2 | 11/2012 | Norcross, Jr. | |
| 8,387,041 B2 | 2/2013 | Branda et al. | |

(Continued)

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

*Primary Examiner* — Phyllis A Book
(74) *Attorney, Agent, or Firm* — Robert D. Bean

(57) ABSTRACT

A file with an exclusive serialization is allocated. The exclusive serialization associated with the newly allocated file is transformed into a shared serialization. The file with the shared serialization is allocated as shared resource for a multisystem environment.

9 Claims, 7 Drawing Sheets

(56) References Cited

U.S. PATENT DOCUMENTS

| | | | |
|---|---|---|---|
| 8,463,815 B1 | 6/2013 | Zoellner | |
| 8,495,131 B2 | 7/2013 | Ahuja et al. | |
| 8,549,616 B2 | 10/2013 | Gerber et al. | |
| 9,306,894 B1* | 4/2016 | Anderson | H04L 51/24 |
| 2006/0047828 A1* | 3/2006 | Dearing | G06F 17/30067 |
| | | | 709/229 |
| 2010/0169894 A1* | 7/2010 | Sheaffer | G06F 9/466 |
| | | | 718/106 |
| 2013/0091383 A1* | 4/2013 | Masser | G06F 11/3632 |
| | | | 714/32 |
| 2013/0111026 A1* | 5/2013 | Chambliss | G06F 17/30362 |
| | | | 709/225 |

* cited by examiner

PSUEDO-CODE FOR A TYPICAL METHOD TO ALLOCATE A FILE FOR SHARED ACCESS

```
svc99 allocate new
    MM connect
    (open while ENQ exclusive)
    MM disconnect
(close)
svc99 de-allocate keep data set
svc99 allocate shr (ENQ shared)
    MM connect
    (open while ENQ shared)

data set (file) ready for use in sysplex shared environment
```

FIG. 4A

PSUEDO-CODE FOR METHOD TO ALLOCATE A FILE FOR SHARED ACCESS

```
svc99 allocate new
    MM connect
    (open while ENQ exclusive)
    ~~MM disconnect~~
    (eliminated)
~~(close)~~
    (eliminated)
~~svc99 de-allocate keep data set~~
    (eliminated)
~~svc99 allocate shr (ENQ shared)~~
    (replaced with) svc99 allocate request to transform ENQ exclusive to shared
    ~~MM connect~~
    (replaced with)
~~(open while ENQ shared)~~
    (--> MM connect awareness of shared ENQ, if necessary)

data set (file) ready for use in sysplex shared environment
```

FIG. 4B

SHARING FILES IN A MULTISYSTEM ENVIRONMENT

BACKGROUND OF THE INVENTION

The present invention relates generally to the field of sharing files in a multisystem environment, and more particularly to creating a file to be shared by computer systems of the multisystem environment.

SUMMARY

Embodiments of the present invention provide systems, methods, and program products. A file with an exclusive serialization is allocated. The exclusive serialization associated with the newly allocated file is transformed into a shared serialization. The file with the shared serialization is allocated as shared resource for a multisystem environment.

BRIEF DESCRIPTION OF THE DRAWINGS

FIGS. 4A and 4B are pseudo-code examples that illustrate eliminated operational steps for sharing a newly allocated file in the multisystem environment;

DETAILED DESCRIPTION

Figure 1:
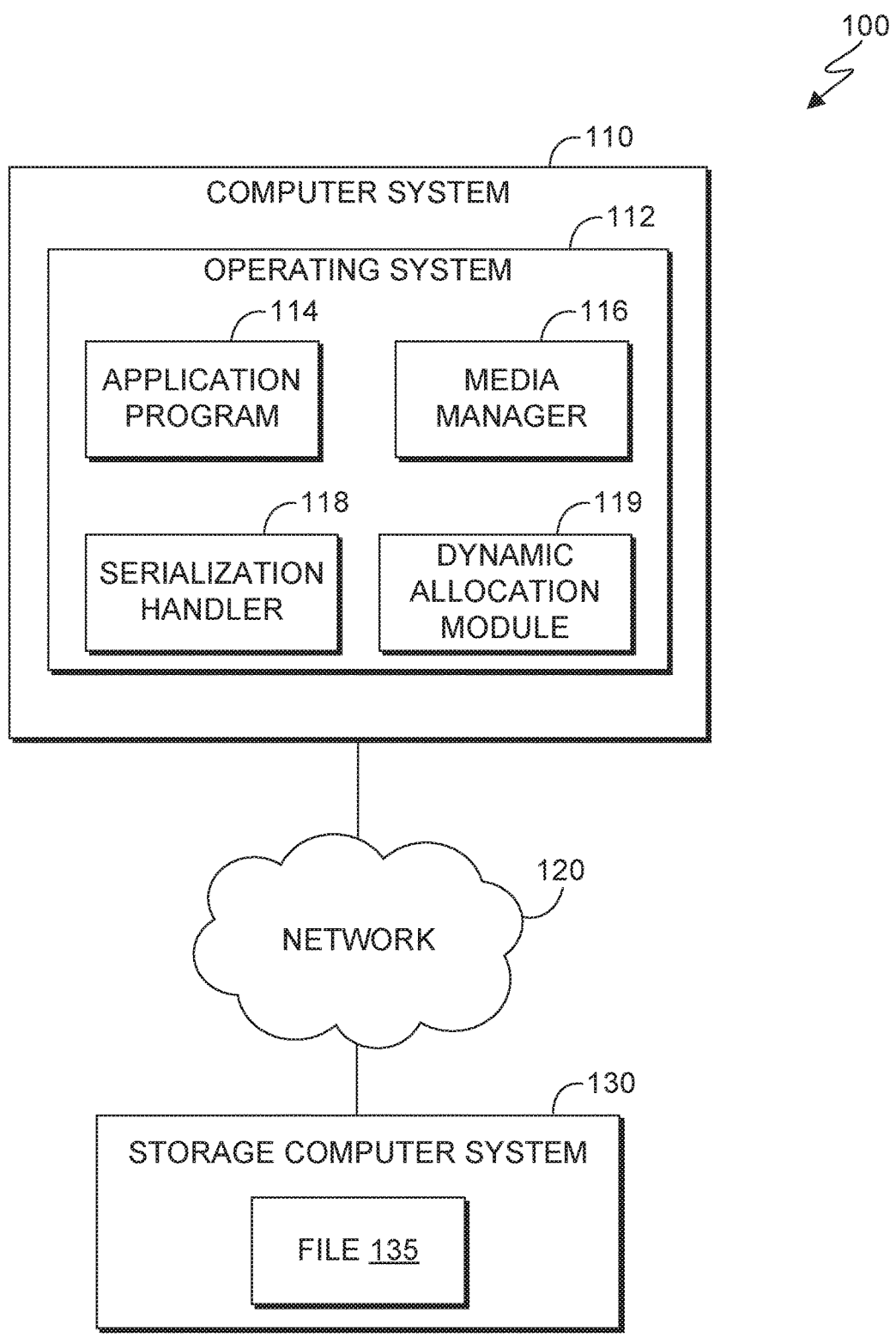
FIG. 1 is a block diagram of a multisystem environment, in accordance with an embodiment of the present invention.

A multisystem environment includes multiple computer systems where an operating system, such as multiple virtual storage (MVS), manages the computer system hardware and software resources for application programs of a computer system. Multisystem environments typically involve more than one computer system accessing shared files that are managed by a storage computer system. Shared files can contain physical data records, each having a discrete location and a unique memory address. For example, a storage computer system can include a direct-access storage device (DASD) and/or be a part of a coupling facility to store shared files.

An operating system for a computer system in the multisystem environment can include an application or system program that requests to create files for shared access in the multisystem environment. For example, the requesting application program can be a system logger MVS component that requests to save data, such as log data, to a shared file, such as a log stream, and requests to retrieve data from the shared file. Typically, another application program, such as a media manager, can communicate with the storage computer system to handle requests from the requesting application program.

Before a file is configured for shared access, a file must first be allocated in the storage computer system via, for example, a DYNALLOC dynamic allocation function. For example, a system logger component interacts with a dynamic allocation module along with media manager services to obtain a physical or logical memory space for a new file. This process many involve a serialization convention, such as an ENQ, where a serialization handler can serialize the creation of a unique name for the newly allocated file. Typically, a systems level scope is required, such that all components of the multisystem environment are properly notified of the name of the newly allocated file. For example, an exclusive ENQ can be obtained for a newly allocated file, such that other application programs attempting to access the newly allocated file are blocked access to the data set until a requesting application program indicates that the newly allocated file is ready to be shared. To allow the data set for shared access by multiple computer systems in the multisystem environment, the exclusive ENQ can be "downgraded" to a shared ENQ for the file. Accordingly, application programs requesting the data set on multiple computer systems in the multisystem environment can be given access to the shared data set.

The serialization handler can implement additional logic that may improve a performance path for an application program that requests to create files for shared access in the multisystem environment, such as the system logger component. For example, a typical mechanism implemented by the system logger component to prepare a file for shared access can require six major operational steps. However, implementing logic by the serialization handler in accordance with the invention can reduce a number of major operational steps performed by the system logger component and thereby improving the performance path by reducing path lengths such as I/O and network path lengths. Furthermore, a typical process for allocating a shared file can be performed extensively in the multisystem environment. Accordingly, the performance path for the extensively performed process is greatly improved by eliminating a number of operational steps from the typical process for allocating a shared file in the multisystem environment.

Embodiments of the present invention provide systems, methods, and computer program products for implementing logic that improves a performance path for an application program requesting to create files for shared access in a multisystem environment. Various embodiments of the present invention provide a mechanism that can reduce the number of operational steps performed by application programs for a computer system in a multisystem environment.

FIG. 1 is a functional block diagram of multisystem environment 100, in accordance with an embodiment of the present invention. Multisystem environment 100 includes computer system 110 and storage computer system 130 interconnected over network 120. Computer system 110 and storage computer system 130 can be desktop computers, laptop computers, specialized computer servers, or any other computer systems known in the art. In certain embodiments, computer system 110 and storage computer system 130 represent computer systems utilizing clustered computers and components to act as a single pool of seamless resources when accessed through network 120. For example, such embodiments may be used in data center, cloud computing, storage area network (SAN), and network attached storage (NAS) applications. In general, computer system 110 and storage computer system 130 are representative of any electronic devices, or combination of electronic devices, capable of executing machine-readable program instructions, as described in greater detail with regard to FIG. 5. Multisystem environment 100 can include a greater or lesser number of computer systems than illustrated similar to that of computer system 110 and storage computer system 130 that are connected via network 120. In other embodiments, computer system 110 and storage computer system 130 may be implemented in a cloud computing environment, as described in greater detail with regard to FIGS. 6 and 7.

Computer system 110 represents a platform that can connect to network 120 to access shared files managed by storage computer system 130. In this embodiment, computer system 110 includes operating system 112. Operating system 112 represents system software that manages hardware and software resources for application programs of computer system 110. For example operating systems 112 can be multiple virtual storage (MVS) operating system implementing an MVS filesystem. In this embodiment, operating system 112 includes application program 114, media manager 116, serialization handler 118, and dynamic allocation module 119. In another embodiment, operating system 112 includes additional components not depicted or described herein.

Storage computer system 130 represents a platform that includes a shared file 135 that computer system 110 accesses. For example, storage computer system 130 can be a sharable facility that contains storage accessible by platforms of multisystem environment 100, such as computer system 110, and performs operations requested by dynamic allocation module 119, media manager 116 and/or components operating within the platforms, such as operating system 112. In this embodiment, storage computer system 130 includes file 135 that represents a resource for storing information.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computer system 110 and storage computer system 130, in accordance with a desired embodiment of the invention.

Application program 114 represents a component that requests to create a file for shared access. In one embodiment, application program 114 can be a system logger component that requests to save data, such as log data, to a shared file, such as a log stream, and requests to retrieve data from the shared file. For example, multiple instances of a system logger component, such as application program 114, can operate on multiple platforms of multisystem environment 100 may update a log stream, such as file 135.

Media manager 116 represents an application program that interacts with storage computer system 130 to provide storage management on storage computer system 130. Application program 114 can utilize media manager 116 to access shared files, as well as prepare newly allocated files for shared access. Typically, media manager 116 is required to connect to and disconnect from a file several times to properly prepare a newly allocated file for shared access.

Serialization handler 118 represents an application program that serializes files as they are created using a serialization convention, such as ENQ. An exclusive ENQ can be obtained for file 135 indicating exclusive control for file 135, meaning file 135 cannot yet be accessed as a shared resource. In this embodiment, a request indicating dynamic allocation module 119 to remove an exclusive serialization for file 135 and maintain file 135 as a defined resource is eliminated when preparing the newly allocated file 135 for shared access, because of the logic implemented by dynamic allocation module 119 and serialization handler 118. In a multisystem environment 100, resource serialization using a serialization convention is needed to coordinate access to resources, such as files, that are used by more than one application program 114. For example, if one application program 114 is reading from file 135 and another application program 114 needs to write to file 135, then to maintain data integrity, the other application program 114 that needs to write must wait until the application program 114 that is reading the data set is finished. Both application programs 114 need to utilize serialization handler 118 to coordinate access to the file. An exclusive serialization, such as exclusive ENQ can be downgraded as a shared serialization, such as shared ENQ, once exclusive control is no longer required. Accordingly, a shared ENQ for a data set enables platforms of multisystem environment 100 to concurrently access the data set as a shared resource. In this embodiment, serialization handler 118 generates an exclusive serialization during a dynamic allocation process for allocating allocate a new file 135 with an exclusive serialization. Subsequently, serialization handler 118 transforms the exclusive serialization associated with the newly allocated file into a shared serialization by implementing logic, as further described below.

Dynamic allocation module 119 represents an application program that provides allocation control to make storage media resources available on storage computer system 130. In this embodiment, dynamic allocation module 119 interacts with application program 114, and serialization handler 118 to perform a dynamic allocation process. In one example, dynamic allocation module 119 may be part of a MVS dynamic allocation process that can use a SVC99 parameter list.

Figure 2:
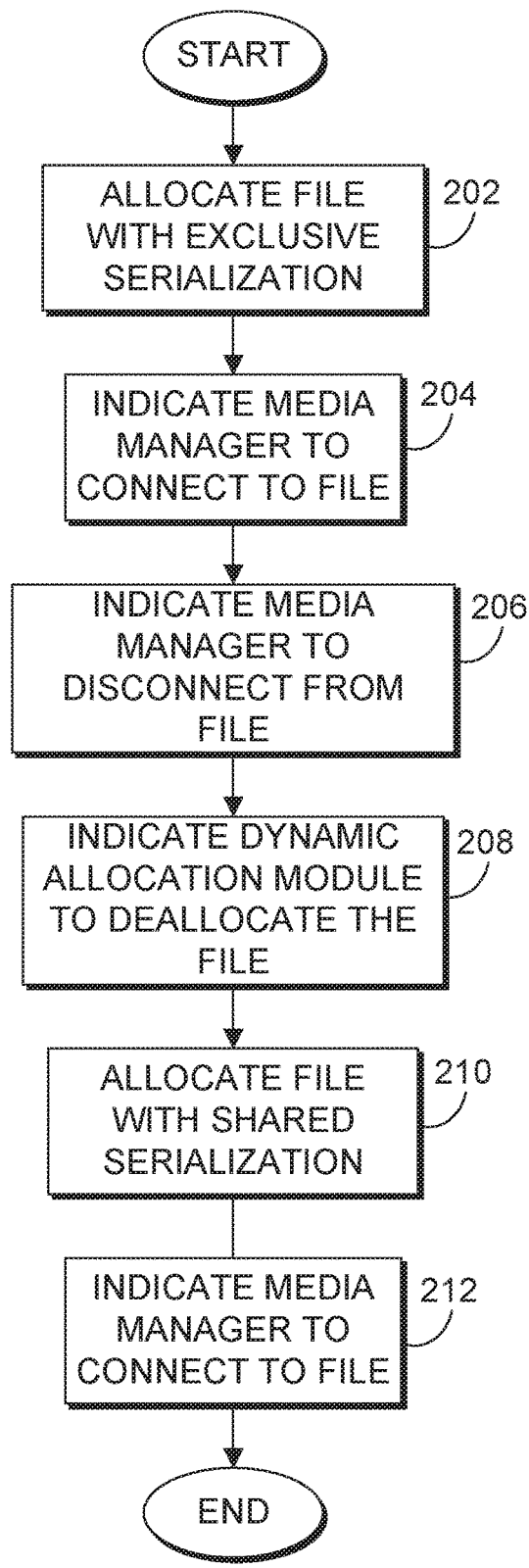
FIG. 2 is a flowchart illustrating typical operational steps for sharing a file in the multisystem environment.

FIG. 2 is a flowchart illustrating the typical operational steps for preparing a newly allocated file for shared access in a typical multisystem environment. A typical dynamic allocation process can be implemented, which involves components of an operating system, such as an application program, a media manager, a serialization handler and a dynamic allocation module.

A typical dynamic allocation module can interact with a serialization handler during a dynamic allocation process to allocate a file with an exclusive serialization (step 202). Once the file is allocated with an exclusive serialization, such as an exclusive ENQ, then a media manager is requested to connect to the newly allocated file (step 204). Typically, connecting to the newly allocated file while the file has an exclusive serialization ensures that a requesting application program confirms that the newly allocated file is associated with appropriate file attributes. Though the file has been allocated, created, serialized, and catalogued, the requesting application program cannot use the file as a shared file yet. After the media manager is indicated to connect to the newly allocated file and the file attributes are verified, the media manager is then indicated to disconnect from the file (step 206) and the dynamic allocation module is indicated to deallocate the newly allocated file (step 208). Typically, this is performed to remove the exclusive serialization from the file while maintaining the file resource defined. Then, the dynamic allocation module interacts with the serialization handler to allocate the file with a shared serialization (step 210). Finally, typically the media manager is indicated to connect to the file (step 212). Accordingly, the file is now ready for shared use in the multisystem environment.

Figure 3:
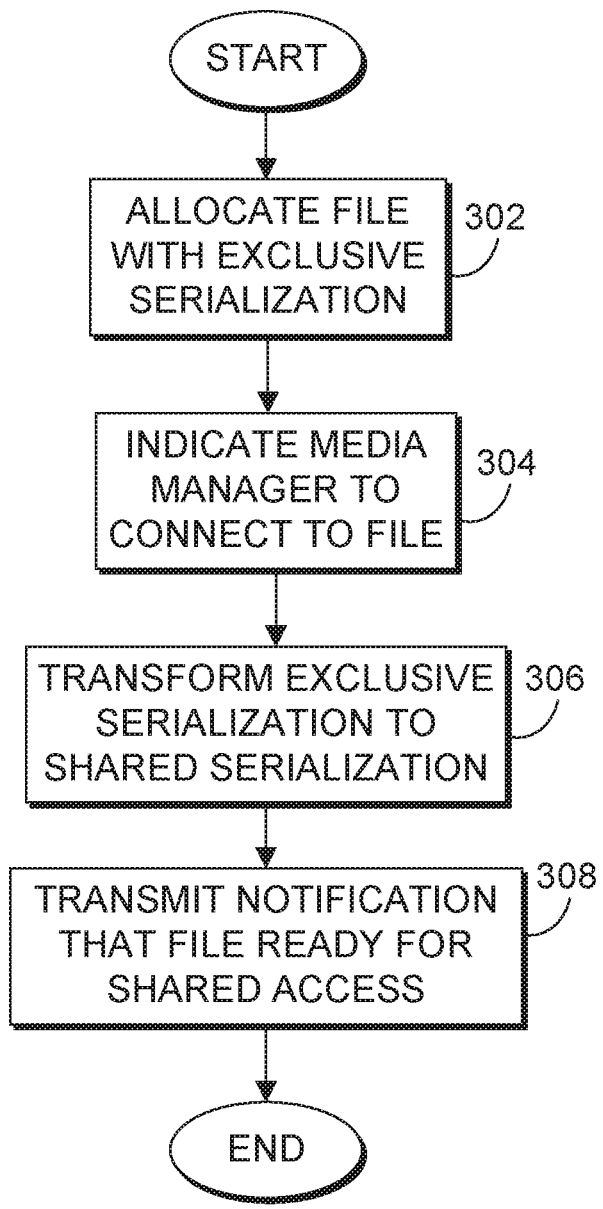
FIG. 3 is a flowchart illustrating operational steps for sharing a file in the multisystem environment, in accordance with an embodiment of the present invention.

FIG. 3 is a flowchart illustrating operational steps for preparing a newly allocated file for shared access in multisystem environment 100, in accordance with an embodiment of the present invention. As previously discussed, serialization handler 118, application program 114, media manager 116, and dynamic allocation module 119, can allocate file 135 on storage computer system 130 for shared access by platforms of multisystem environment 100.

Dynamic allocation module 119 can interact with serialization handler 118 during a dynamic allocation process to allocate file 135 with an exclusive serialization (step 302). Media manager 116 is requested to open, or connect to file 135, so that application program 114 can confirm that file 135 has appropriate file parameters (step 304). After file 135 is confirmed by application program 114, indicating that file 135 has appropriate file parameters, then application program 114 uses dynamic allocation module 119 and serialization handler 118 to implement additional logic to downgrade the exclusive serialization to a shared serialization (step 306). Accordingly, the newly allocated file now has a shared serialization and is ready to be accessed as a shared file. In one embodiment, serialization handler 118 first communicates a request to downgrade to a shared serialization, where the request is handled by media manager 116. In certain embodiments, serialization handler 118 may transmit a notification to platforms of multisystem environment 100 indicating that the newly allocated file is now a file for shared access (step 308).

In this manner, advantages over the typical shared file allocation are realized by eliminating more than one of the steps presented as pseudo-code in FIG. 4A and instead, implementing logic that follows pseudo-code as presented in FIG. 4B. A number of operational steps are removed, and accordingly reduce a performance length path associated with a typical process for shared file allocation. For example, an operation can be performed extensively in a multisystem environment, which involves the operational steps presented in FIG. 4A. Accordingly, by reducing a number of operational steps for this operation which is performed extensively in the multisystem environment, the overall path length required for a shared file allocation is greatly reduced.

Figure 5:
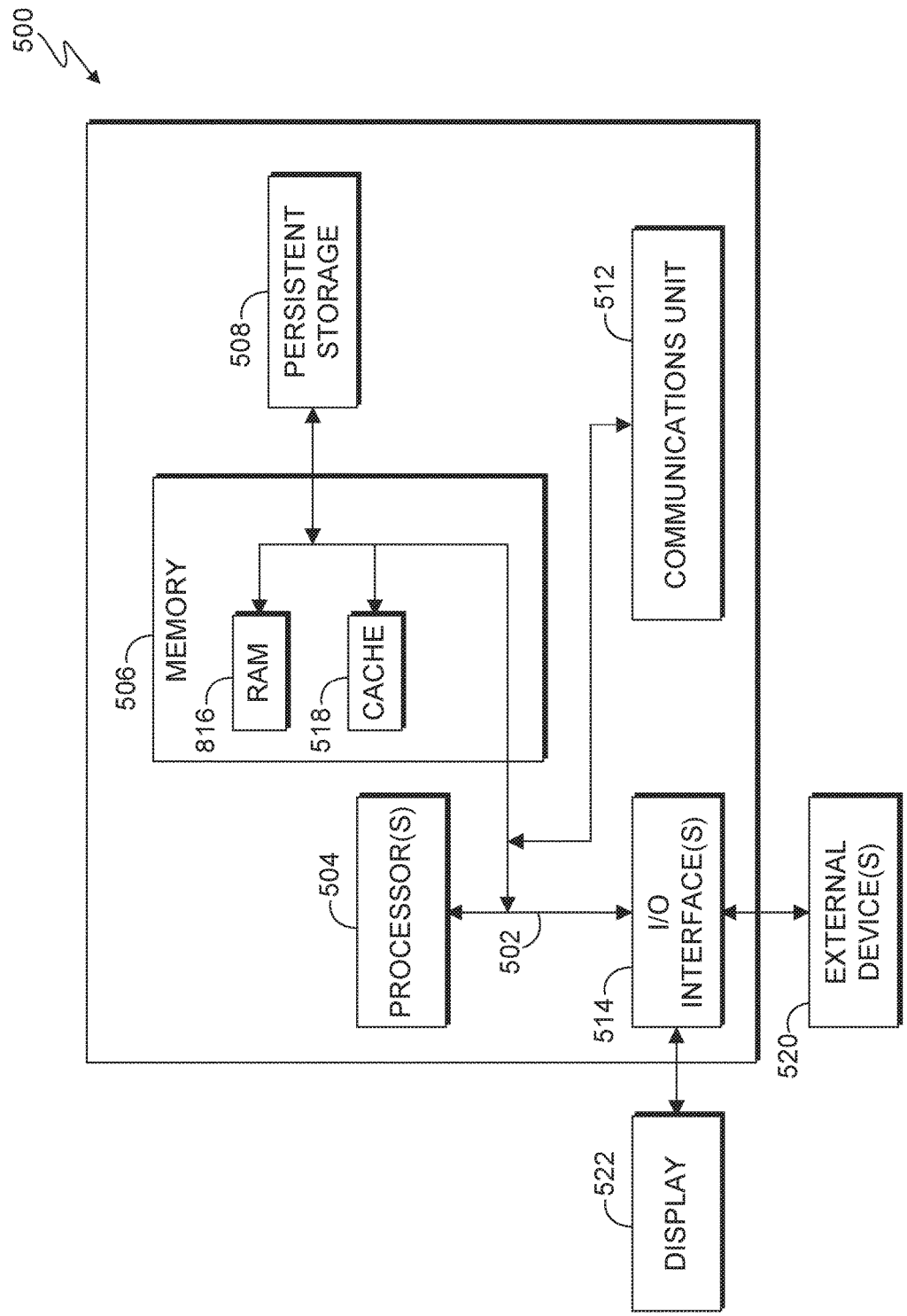
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 408, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520, such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

Figure 6:
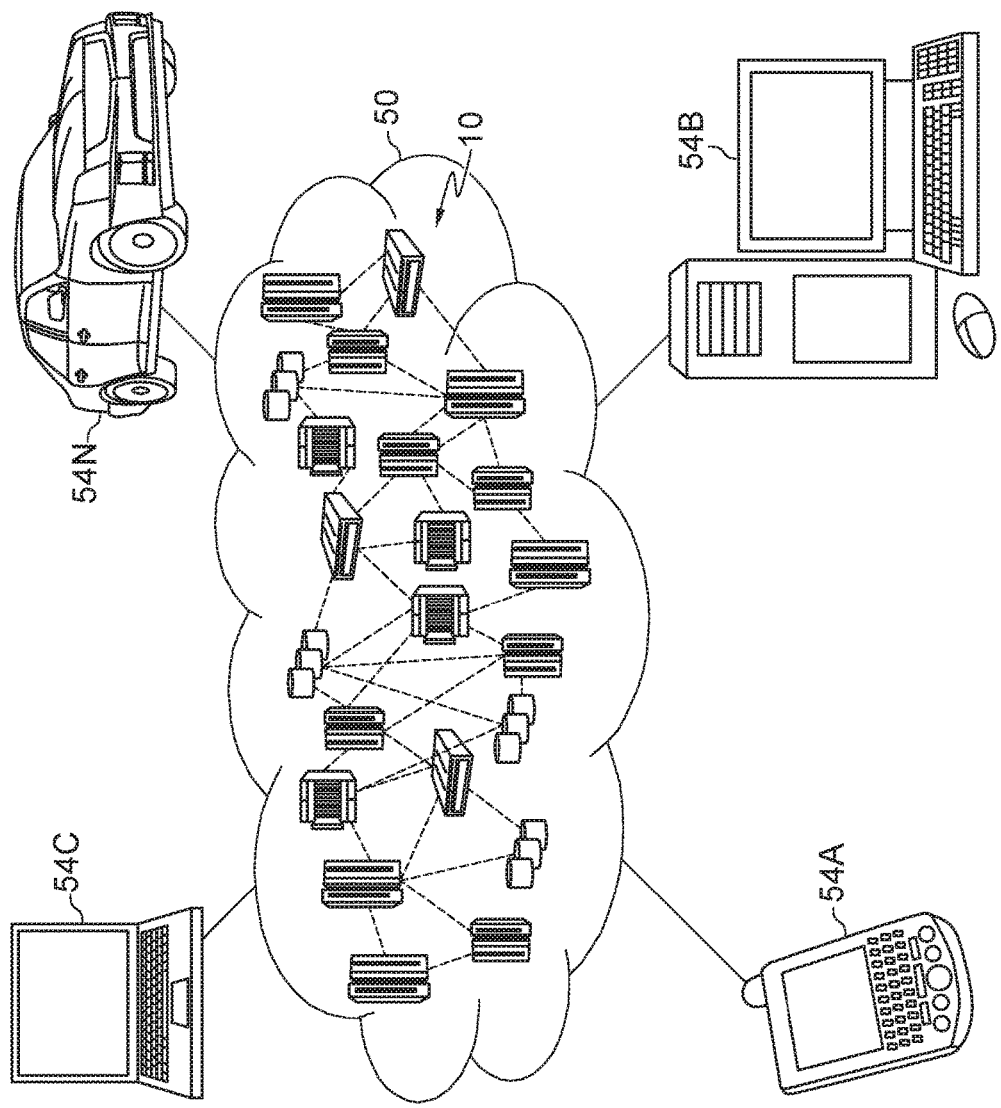
FIG. 6 depicts a cloud computing environment, in accordance with an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 7:
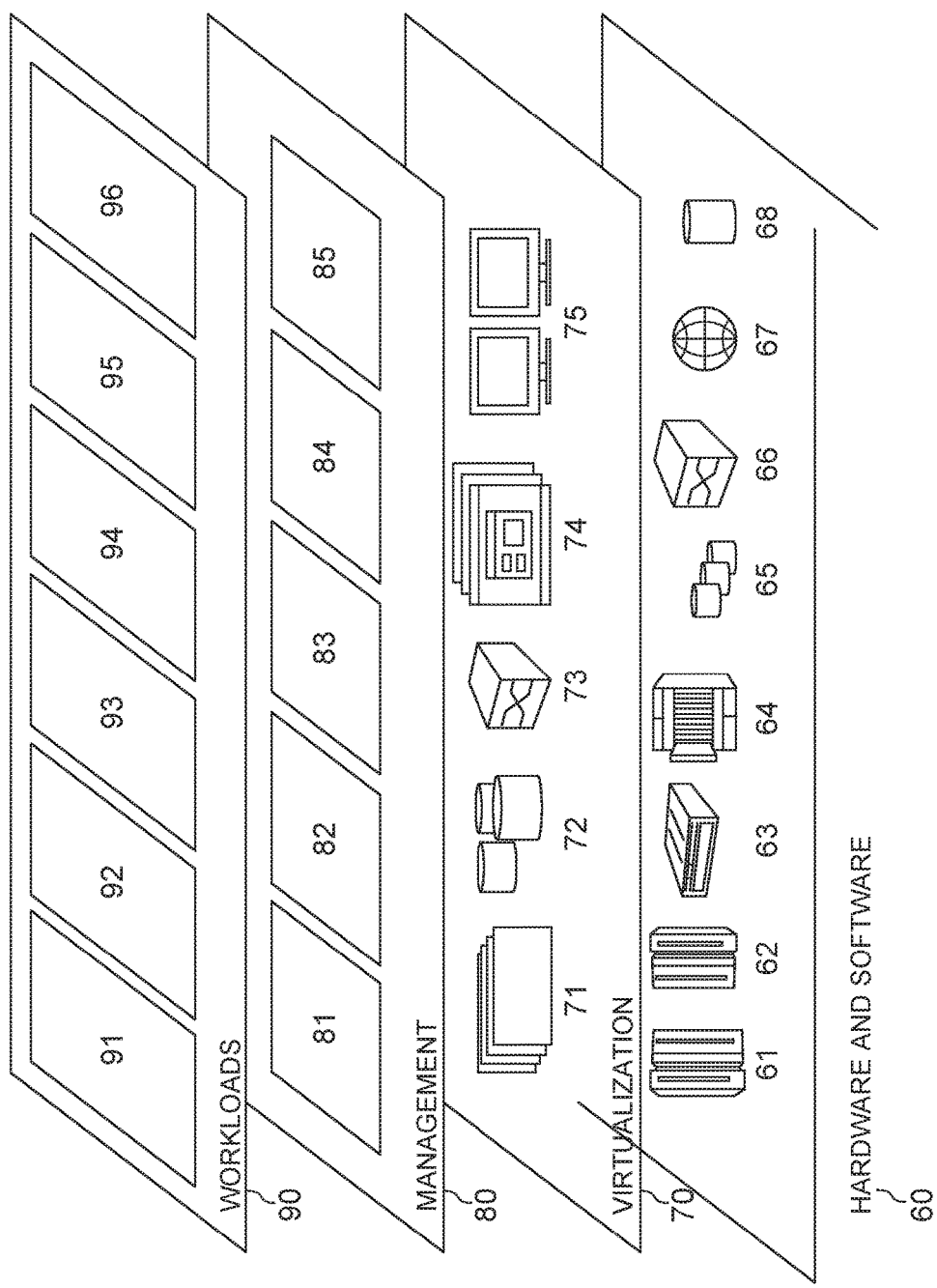
FIG. 7 depicts abstraction model layers, in accordance with an embodiment of the present invention.

Referring now to FIG. 7, a set of functional abstraction layers provided by cloud computing environment 50 (FIG. 6) is shown. The components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multisystem environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, from a system logger component, a request to access a file with an exclusive serialization;
   allocating, by one or more computer processors, in response to the request, the file with an exclusive serialization;
   transforming, by the one or more computer processors, the exclusive serialization associated with the newly allocated file into a shared serialization, wherein transforming the exclusive serialization associated with the newly allocated file into a shared serialization comprises:
   connecting, by a media manager, to the newly allocated file;
   verifying, by the media manager, the file attributes of the newly allocated file;
   disconnecting, by the media manager, from the newly allocated file;
   deallocating, by a dynamic allocation module, the newly allocated file, wherein the dynamic allocation module is a part of a multiple virtual storage (MVS) dynamic allocation process; and
   allocating, by the dynamic allocation module, the deallocated file with the shared serialization, wherein the newly allocated file associated with the shared serialization is configured to be a sharable resource for each platform connected to a network in a multisystem environment;
   notifying, by the one or more computer processors, that the allocated file with the transformed shared serialization is configured as a sharable resource for the multisystem environment; and
   notifying, by a serialization handler, one or more platforms of the multisystem environment indicating that the allocated file is now a file for shared access.

2. The method of claim 1, wherein allocating a file with the exclusive serialization comprises:
   connecting, by the one or more computer processors, to the allocated file with the exclusive serialization to confirm that the allocated file is associated with file attributes specified by a requesting program application.

3. The method of claim 1, wherein transforming the exclusive serialization associated with the newly allocated file into a shared serialization further comprises:
   requesting, by the one or more computer processors, a serialization handler to transform the exclusive serialization associated with the newly allocated file into a shared serialization; and
   performing, by the one or more computer processors, the request to transform the exclusive serialization associated with the newly allocated file into a shared serialization.

4. A computer program product comprising:
   one or more computer readable storage media and program instructions stored on the one or more computer readable storage media, the program instructions comprising:
   program instructions to receive, from a system logger component, a request to access a file with an exclusive serialization;
   program instructions to allocate, in response to the request, the file with an exclusive serialization;
   program instructions to transform the exclusive serialization associated with the newly allocated file into a shared serialization, wherein transforming the exclusive serialization associated with the newly allocated file into a shared serialization comprises;
   connecting, by a media manager, to the newly allocated file;
   verifying, by the media manager, the file attributes of the newly allocated file;
   disconnecting, by the media manager, from the newly allocated file;
   deallocating, by a dynamic allocation module, the newly allocated file, wherein the dynamic allocation module is a part of a multiple virtual storage (MVS) dynamic allocation process; and
   allocating, by the dynamic allocation module, the deallocated file with the shared serialization, wherein the newly allocated file associated with the shared serialization is configured to be a sharable resource for each platform connected to a network in a multisystem environment;
   program instructions to notify that the allocated file with the transformed shared serialization is configured as a sharable resource for the multisystem environment; and
   program instructions to notify, by a serialization handler, one or more platforms of the multisystem environment indicating that the allocated file is now a file for shared access.

5. A computer program product of claim 4, wherein the program instructions to allocate a file with the exclusive serialization comprise:
   program instructions to connect to the allocated file with the exclusive serialization to confirm that the allocated file is associated with file attributes specified by a requesting program application.

6. A computer program product of claim 4, wherein the program instructions to transform the exclusive serialization associated with the newly allocated file into a shared serialization further comprise:
program instructions to request a serialization handler to transform the exclusive serialization associated with the newly allocated file into a shared serialization; and
program instructions to perform the request to transform the exclusive serialization associated with the newly allocated file into a shared serialization.

7. A computer system comprising:
one or more computer processors;
one or more computer readable storage media;
program instructions stored on the one or more computer readable storage media for execution by at least one of the one or more processors, the program instructions comprising:
program instructions to receive, from a system logger component, a request to access a file with an exclusive serialization;
program instructions to allocate, in response to the request, the file with an exclusive serialization;
program instructions to transform the exclusive serialization associated with the newly allocated file into a shared serialization, wherein transforming the exclusive serialization associated with the newly allocated file into a shared serialization comprises:
connecting, by a media manager, to the newly allocated file;
verifying, by the media manager, the file attributes of the newly allocated file;
disconnecting, by the media manager, from the newly allocated file;
deallocating, by a dynamic allocation module, the newly allocated file, wherein the dynamic allocation module is a part of a multiple virtual storage (MVS) dynamic allocation process; and
allocating, by the dynamic allocation module, the deallocated file with the shared serialization, wherein the newly allocated file associated with the shared serialization is configured to be a sharable resource for each platform connected to a network in a multisystem environment;
program instructions to notify that the allocated file with the transformed shared serialization is configured as a sharable resource for the multisystem environment; and
program instructions to notify, by a serialization handler, one or more platforms of the multisystem environment indicating that the allocated file is now a file for shared access.

8. A computer system of claim 7, wherein the program instructions to allocate a file with the exclusive serialization comprise:
program instructions to connect to the allocated file with the exclusive serialization to confirm that the allocated file is associated with file attributes specified by a requesting program application.

9. A computer system of claim 7, wherein the program instructions to transform the exclusive serialization associated with the newly allocated file into a shared serialization further comprise:
program instructions to request a serialization handler to transform the exclusive serialization associated with the newly allocated file into a shared serialization; and
program instructions to perform the request to transform the exclusive serialization associated with the newly allocated file into a shared serialization.

* * * * *